United States Patent [19]

Tatemoto

[11] 4,271,897

[45] Jun. 9, 1981

[54] AIR CONDITIONING DISPLAY SYSTEM FOR VEHICLES

[75] Inventor: Minoru Tatemoto, Ohbu, Japan

[73] Assignee: Mitsubishi Jidosha Kogyo Kabushiki Kaisha, Tokyo, Japan

[21] Appl. No.: 882,255

[22] Filed: Feb. 28, 1978

[30] Foreign Application Priority Data

Jun. 29, 1977 [JP] Japan .............................. 52-84809[U]
Sep. 5, 1977 [JP] Japan ........................... 52-118443[U]
Jan. 17, 1978 [JP] Japan .................................... 53-3452

[51] Int. Cl.³ ............................................ F28F 27/00
[52] U.S. Cl. .................... 165/11 R; 165/25; 165/43; 73/432 AD; 237/12.3 B; 340/52 F; 340/525
[58] Field of Search ........................ 165/11, 43, 27, 42, 165/25; 73/432 AD; 237/12.3 B; 340/52 F, 525, 79, 286 M, 524; 62/126; 236/94; 123/41.15

[56] References Cited

U.S. PATENT DOCUMENTS 3,865,182  2/1975  Blossom ................................. 165/27
4,174,749  11/1979  Oishi ..................................... 165/11

Primary Examiner—Albert W. Davis
Assistant Examiner—Margaret A. Focarino
Attorney, Agent, or Firm—Oldham, Oldham, Hudak & Weber Co.

[57] ABSTRACT

An air conditioning display system for a vehicle comprising a vehicle's air conditioner proper including a plurality of air intake ducts, a plurality of air discharge ducts, a plurality of dampers, and a fan unit, an air conditioner actuator actuating the dampers and the fan unit thereby introducing and discharging air into and out of the air conditioner proper, and a display device including a display panel carrying the picture of the vehicle body portions including the front seat, front glass and bonnet for displaying the flowing patterns of air into and out of the air conditioner proper under control of a control section. Lamps emitting light of, for example, red color and blue color are disposed behind the display panel and are selectively energized so that the occupant can readily visually confirm the flow of warm air or cold air from the duct outlets and also the flowing directions of air.

3 Claims, 21 Drawing Figures

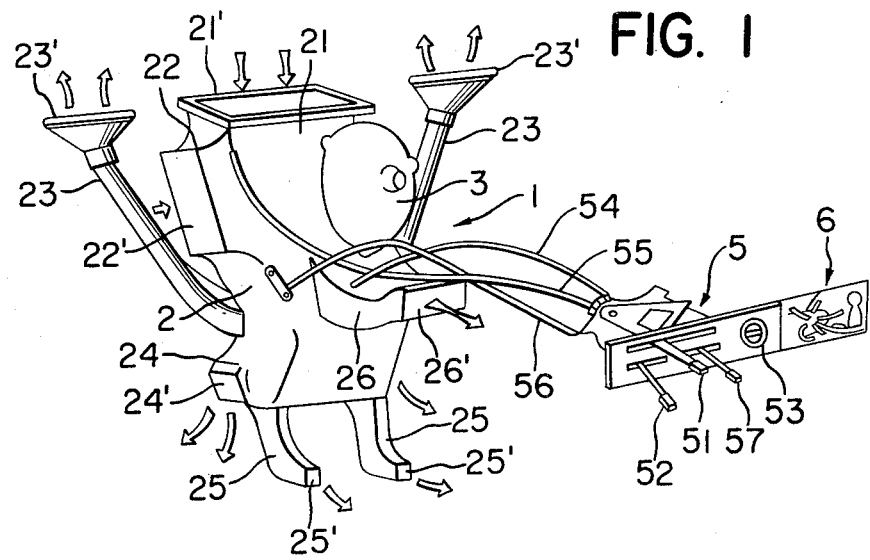
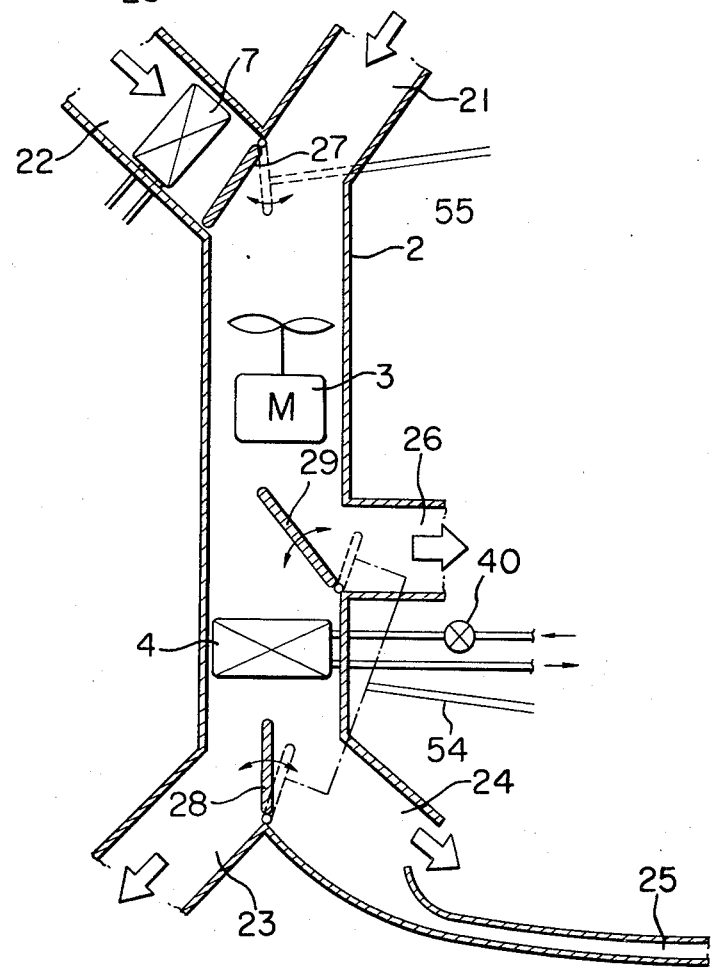

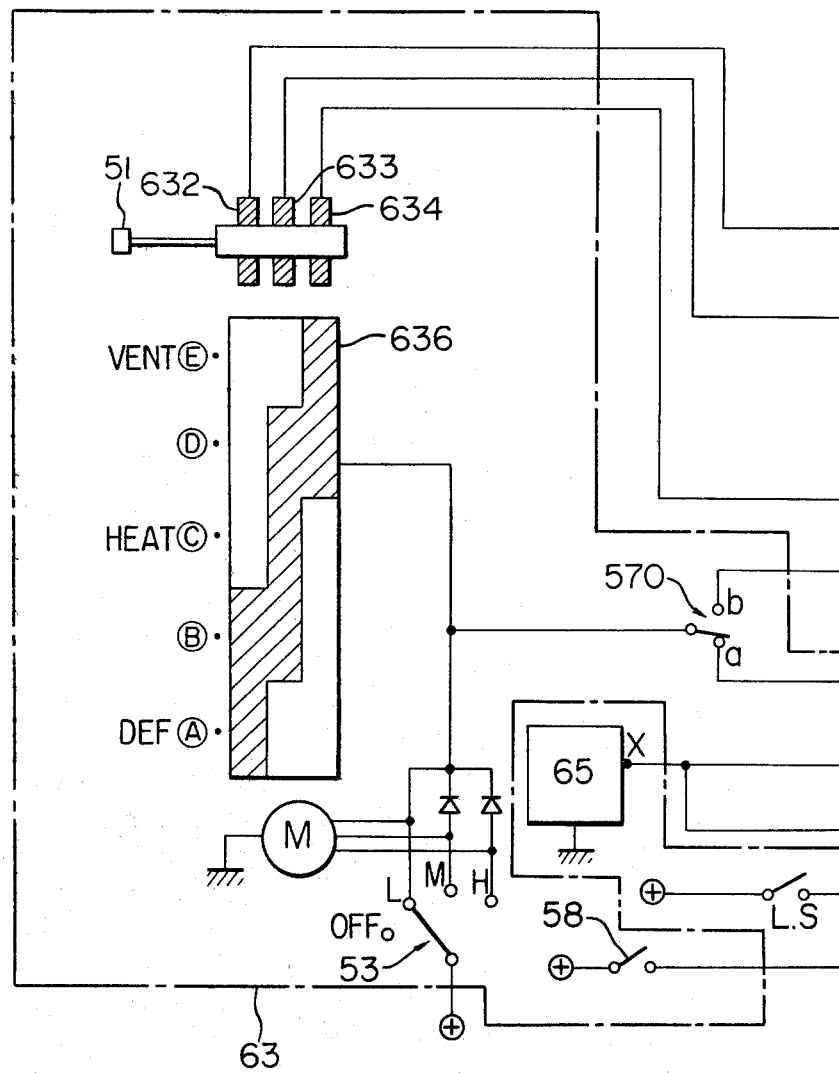

AIR CONDITIONING DISPLAY SYSTEM FOR VEHICLES

BACKGROUND OF THE INVENTION

This invention relates to an air conditioning display system which operates in interlocking relation with an actuator for an air conditioner used in an automotive vehicle or the like and pictorially displays the directions of air flow, presence or absence of air flow and air temperatures on a display panel so that an occupant manipulating the air conditioner actuator can readily know the operating state of the air conditioner by merely looking at the display panel.

In a conventional display system for displaying the operation of an air conditioner for a vehicle or the like, pilot lamps or abbreviated letters such as "VENT" and "DEF" have been merely provided on or adjacent to the actuator panel to display the operating state of the air conditioner. However, with such manner of display, the occupant manipulating the air conditioner actuator has been unable to visually confirm the presence or absence of air flow from a specific duct outlet and the temperature of air discharged from such an outlet. Further, the prior art of air conditioning display using merely the pilot lamps and abbreviated letters such as "VENT" and "DEF" has been quite inconvenient for the user since he cannot readily identify the location of the duct outlet from which air is flowing out now. For the conveniences of the user, the air conditioner instruction manual has described how to use the air conditioner in detail over many pages.

SUMMARY OF THE INVENTION

With a view to obviate such prior art inconveniences, it is a primary object of the present invention to provide a novel air conditioning display system for a vehicle, in which the following patterns of air into and out of a plurality of ducts controlled by a plurality of dampers in a vehicle's air conditioner are pictorially displayed on a display panel in a form to be readily visually identified by the user, and a plurality of lamps turned on and off in interlocking relation with the manipulation of a change-over lever of an air conditioner actuator are used to viewably display the directions of air flow into and out of the ducts, presence or absence of such air flow and air temperatures at the duct inlets and outlet.

BRIEF DESCRIPTION OF THE DRAWINGS

This invention will be explained by way of example with reference to the accompanying drawings in which;

FIG. 1 is a schematic perspective view of a first embodiment of the air conditioning display system according to the present invention, FIG. 2 illustrates part of an air conditioner proper of the system shown in FIG. 1.

DESCRIPTION OF THE PREFERRED EMBODIMENTS

Figure 3:
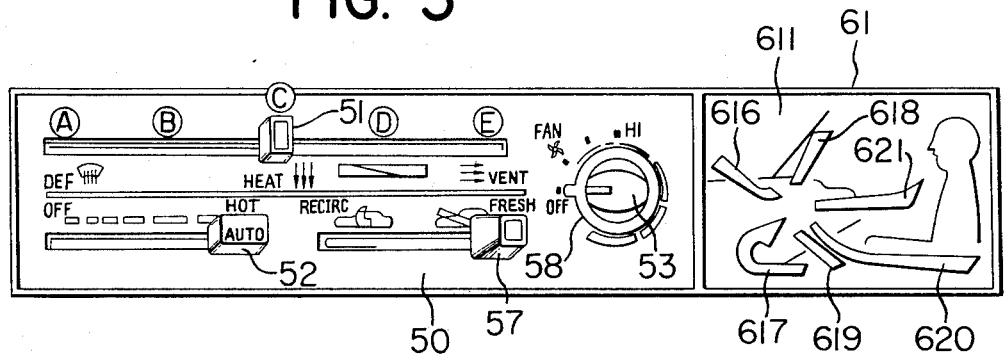
FIG. 3 is an enlarged front elevational view of an air conditioner actuator and a display section of the system shown in FIG. 1.

A first embodiment of the present invention will now be described in detail with reference to FIGS. 1 to 10.

Referring to FIGS. 1 to 10, a vehicle's air conditioner proper 1 includes an air duct 2, a fan unit 3 and a heater core 4. One end of the air duct 2 is branched into an external air intake duct 21 having an inlet 21' and a compartment air intake duct 22 having an inlet 22'. The other end of the air duct 2 is also branched into a defroster air discharge duct 23 having an outlet 23' and a pair of air discharge ducts 24 and 25 having outlets 24' and 25' directing air toward the foot portions of occupants on the front and rear seats respectively. A ventilation air discharge duct 26 having an outlet 26' is branched from an intermediate portion of the air duct 2 for directing air toward the upper half of the body of an occupant sitting on the front seat. A first damper 27 is disposed between the external air intake duct 21 and the compartment air intake duct 22. A second damper 28 is disposed between the defroster air discharge duct 23 and the front and rear seat foot air discharge ducts 24 and 25. A third damper 29 is disposed between the vent discharge duct 26 and the air duct 2. The fan unit 3 is disposed in the air duct 2 between the first damper 27 and the third damper 29, while the heater core 4 is disposed in the air duct 2 between the third damper 29 and the second damper 28 to be supplied with engine cooling water. A valve 40 regulates the amount of engine cooling water supplied to the heater core 4. An evaporator 7 of a cooler is disposed in the compartment air intake duct 22.

An air conditioner actuator 5 is mounted adjacent to the instrument panel of the vehicle and includes an actuator panel 50, a change-over lever 51, a heater lever 52, a fan switch 53, an internal-external air lever 57 and a cooler switch 58. The change-over lever 51 is operatively connected with the second and third dampers 28 and 29 by a cable 54. When the change-over lever 51 is moved to a position A labeled "DEF" on the panel 50, the second damper 28 closes the foot air discharge ducts 24 and 25 and opens the defroster air discharge duct 23, while the third damper 29 closes the ventilation air discharge duct 26. When the change-over lever 51 is moved to a position B intermediate the position A labeled "DEF" and a position C labeled "HEAT", the third damper 29 remains in the position corresponding to the "DEF" position of the changer-over lever 51, and the second damper 28 takes its neutral position as shown in FIG. 2 to partly open the defroster air discharge duct 23 and foot air discharge ducts 24, 25. When the change-over lever 51 is moved to the position C labeled "HEAT", the second damper 28 closes the defroster air discharge duct 23 and opens the foot air discharge ducts 24, 25 while the third damper 29 remains still in the position closing the ventilation air discharge duct 26. When the change-over lever 51 is moved to a position D intermediate the "HEAT" position and a position E labeled "VENT", the third damper 29 takes its neutral position as shown in FIG. 2 to permit flow of air through the ventilation air discharge duct 26 and foot air discharge ducts 24, 25, while the second damper 28 remains in the same position as it takes in the "HEAT" position of the change-over lever 51. When the change-over lever 51 is moved to the position E labeled "VENT", the third damper 29 closes the air duct 2 and opens the ventilation air discharge duct 26. The heater lever 52 is operatively connected with the valve 40 by a cable 56, and this valve 40 is fully closed when the heater lever 52 is kept in its "OFF" position at the left-hand end of its stroke in FIG. 3. As the heater lever 52 is moved toward the right in FIG. 3 from the "OFF" position, the opening of the valve 40 is gradually increased until finally the valve 40 is fully opened when the heater lever 52 reaches the "HOT" position at the right-hand end of its stroke in FIG. 3. The fan switch 53 is selectively placed in one of the "OFF", "L", "M" and "H" positions. The internal-external air lever 57 is operatively connected with the first damper 27 by a cable 55, so that, when this lever 57 is moved to a position labeled "RECIRC," the first damper 27 closes the external air intake duct 21 and opens the compartment air intake duct 22, while when the lever 57 is moved to a position labeled "FRESH," the first damper 27 opens the external air intake duct 21 and closes the compartment air intake duct 22. In the "OFF" position of the cooler switch 58, the refrigerant is not supplied to the cooler evaporator 7. As this switch 58 is turned clockwise in FIG. 3 from its "OFF" position, the refrigerant is supplied to the evaporator 7, and the amount of the supplied refrigerant is controlled by the angular position of the switch 58.

An air conditioning display device 6 comprises a display section 61 and a control section 62. The display section 61 is disposed adjacent to the air conditioner actuator 5 and includes a display panel 611, a smoked panel 612, a shielding plate 613, partition plates 614 and a casing 615. The display panel 611 is in the form of a transparent plate of glass or acrylic resin fixed at its peripheral edges to the casing 615, and the profiles 611' of the vehicle's front glass, bonnet, instrument panel and driver are depicted on the back face of the transparent plate with a paint of color such as while which is easily visible to the eye. An illuminating lamp 650 is disposed along the lower edge of the display panel 611. The smoked panel 612, which is a plate of glass or acrylic resin, is disposed on the back side of the display panel 611 in slightly spaced apart relation therefrom, and the shielding plate 613 is bonded to the back face of the smoked panel 612. A "FRESH" display pattern 616 is provided by cutting out a portion of the shielding plate 613 in the form of a substantially straight elongated slot having an arrow-shaped end so as to pictorially display the flowing pattern of air into the air conditioner proper 1 from the outlet 21' of external air intake duct 21. A "RECIRC" display pattern 617 is provided by cutting out another portion of the shielding plate 613 in the form of an elongated curved slot having an arrow-shaped end so as to pictorially display the flowing pattern of air into the air conditioner proper 1 from the inlet 22' of compartment air intake duct 22. A "DEF" display pattern 618 is provided by cutting out another portion of the shielding plate 613 in the form of a substantially straight elongated slot having its width increased gradually toward the direction of discharge of air so as to pictorially display the flowing pattern of air out of the outlet 23' of defroster air discharge duct 23. A "HEAT" display pattern 619 and a "HEAT/R" display pattern 620 are provided by cutting out portions of the shielding plate 613 in the form of substantially straight elongated slots having their width increased toward the dirction of discharge of air the direction in which the air is flowing so as to pictorially display the flowing patterns of air out of the outlets 24' and 25' of front and rear seat foot air discharge ducts 24 and 25 respectively. A "VENT" display pattern 621 is provided by cutting out another portion of the shielding plate 613 in a manner similar to the "HEAT" display pattern 619 so as to pictorially display the flowing pattern of air out of the outlet 26' of ventilation air discharge duct 26.

Figure 4:
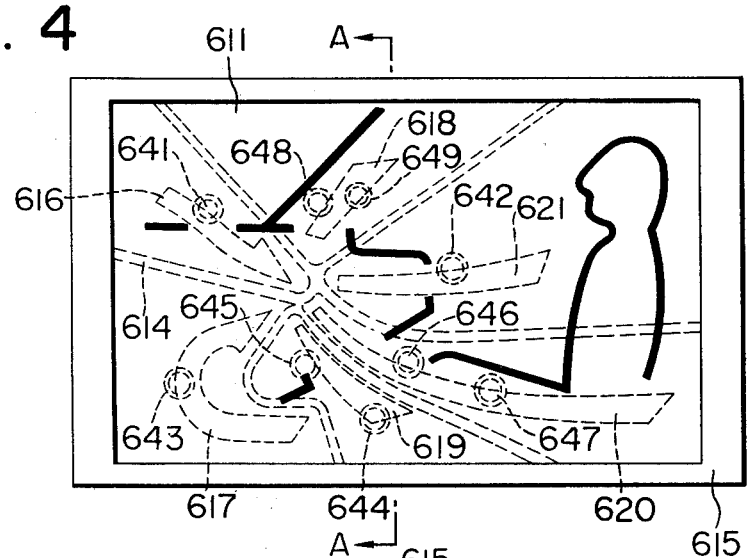
FIG. 4 is an enlarged detail view of the display section shown in FIG. 3.
Figure 5:
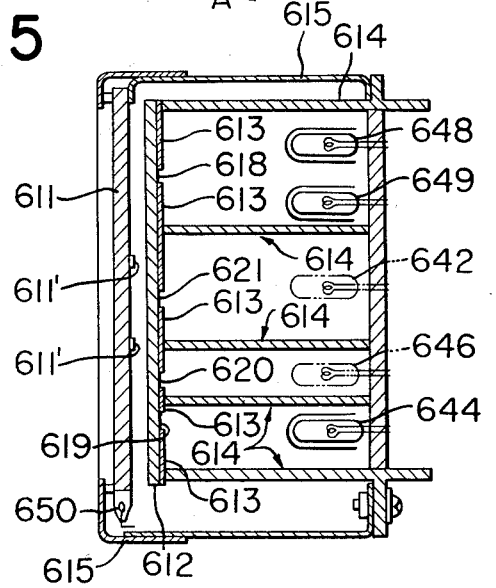
FIG. 5 is a sectional view taken along the line A—A in FIG. 4.

The partition plates 614 extend on the back side, or right-hand side in FIG. 5, of the shielding plate 613 so as to define independent spaces for the illumination of the individual display patterns 616 to 621 as shown in FIG. 5. Referring to FIG. 4, a blue-emitting first lamp 641 is disposed in the space behind the "FRESH" display pattern 616, and a blue-emitting third lamp 643 is disposed in the space behind the "RECIRC" display pattern 617. A red-emitting eighth lamp 648 and a blue-emitting ninth lamp 649 are disposed in the space behind the "DEF" display pattern 618, and a red-emitting fourth lamp 644 and a blue-emitting fifth lamp 645 are disposed in the space behind the "HEAT" display pattern 619. A red-emitting sixth lamp 646 and a blue-emitting seventh lamp 647 are disposed in the space behind the "HEAT/R" display pattern 620, and a blue-emitting second lamp 642 is disposed in the space behind the "VENT" display pattern 621. The red-emitting lamps are provided by covering incandescent lamps with a red cap, and the blue-emitting lamps are provided by covering incandescent lamps with a blue cap.

Figure 6:
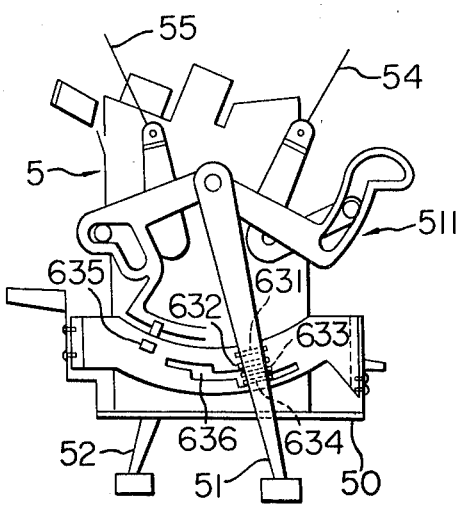
FIG. 6 is an enlarged plan view of the air conditioner actuator shown in FIG. 1.
Figure 7B:
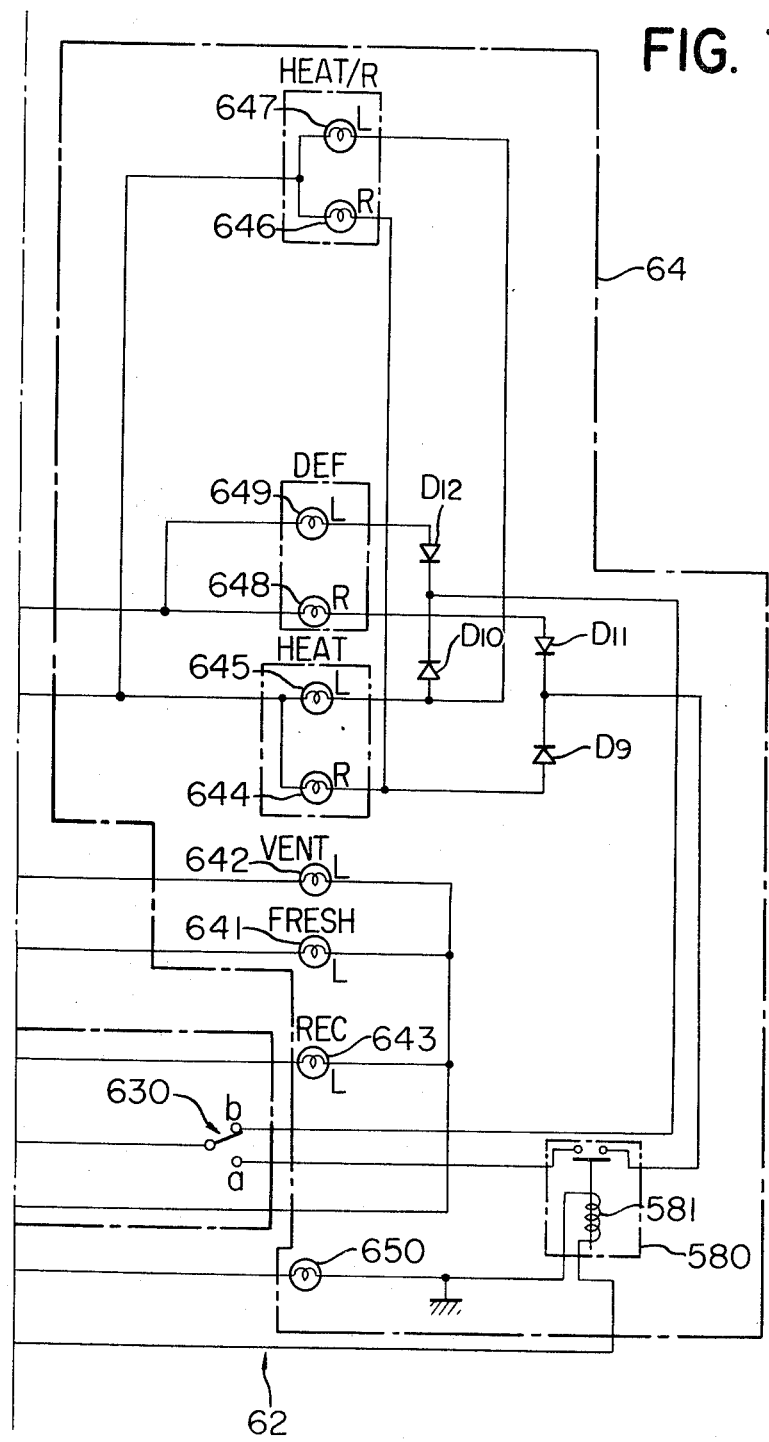
FIG. 7 is a circuit diagram of a control section in the first embodiment.

The control section 62 comprises a switch array 63 disposed in the air conditioner actuator 5, a lamp array 64 disposed on the back side of the display panel 611, and a flickering circuit 65. The switch array 63 includes a first, a second and a third brush 632, 633, 634, a electrode plate 636, the fan switch 53, a heater switch 630 turned on and off by the heater lever 52, an internal-external air switch 570 and the cooler switch 58. The first to third conductive brushes 632 to 634 are arcuate in shape and are mounted in circumferentially parallel relation on the lower surface of the change-over lever 51 pivoted to a suitable portion of the air conditioner actuator 5 for making swinging movement on the panel 50 of air conditioner actuator 5 as best shown in FIG. 6. The electrode plate 636 is also arcuate in shape so as to be electrically engaged by the brushes 632 to 634 as shown in FIG. 6. The electrode plate 636 has a circumferentially outwardly stepped configuration as shown in FIG. 6 and is engaged by the first brush 632 when the change-over lever 51 is moved to the position A labeled "DEF" in FIG. 3. This electrode plate 636 is engaged by both the first and second brushes 632 and 633 when the change-over lever 51 is moved to the position B in FIG. 3, and by the second brush 633 only in the position of the lever 51 when moved to the position C labeled "HEAT". Further, this electrode plate 636 is engaged by both the second and third brushes 633 and 634 when the lever 51 is moved to the position D in FIG. 3, and by the third brush 634 only in the position of the lever 51 when moved to the position E labeled "VENT" in FIG. 3. In FIG. 7 showing the structure of the control section 62, the first to third brushes 632 to 634 and the electrode plate 636 are merely schematically illustrated for conveniences of explanation. The heater switch 630 is connected with a terminal X of flickering circuit 65, and its movable arm is in contact with a stationary contact b when the heater lever 52 is placed in its "OFF" position. In any other position of the heater lever 52, its movable arm is brought into contact with another stationary contact a. The internal-external air switch 570 is switched over from one position to the other with the movement of the internal-external air lever 57. That is, its movable arm is brought into contact with a stationary contact a when the lever 57 is moved to the "RECIRC" position, while its movable arm is brought into contact with another stationary contact b when the lever 57 is moved to the "FRESH" position. The fan switch 53 controls the amount of air discharged from the fan unit 3 depending on its "L", "M" or "H" position, and this switch 53 is so connected that current from the battery can be supplied to the electrode plate 636 and to the internal-external air switch 570 in any one of its "L", "M" and "H" positions.

The lamp array 64 includes the aforementioned first to ninth lamps 641 to 649, the aforementioned illuminating lamp 650 and a cooler relay 580. The first lamp 641 is connected at one terminal thereof with the contact b of internal-external air switch 570 and at the other terminal thereof with the terminal X of flickering circuit 65. The second lamp 642 is connected at one terminal thereof with the third brush 634 and at the other terminal thereof with the terminal X of flickering circuit 65. The third lamp 643 is connected at one terminal thereof with the contact a of internal-external air switch 570 and at the other terminal thereof with the terminal X of flickering circuit 65. The fourth lamp 644 is connected at one terminal thereof with the second brush 633 and at the other terminal thereof with one stationary contact of cooler relay 580 through a diode $D_9$. The fifth lamp 645 is connected at one terminal thereof with the second brush 633 and at the other terminal thereof with the contact b of heater switch 630 through a diode $D_{10}$. The sixth lamp 646 and seventh lamp 647 are connected in parallel with the fourth lamp 644 and fifth lamp 645 respectively. The eighth lamp 648 is connected at one terminal thereof with the first brush 632 and at the other terminal thereof with the contact of cooler relay 580 through a diode $D_{11}$. The ninth lamp 649 is connected at one terminal thereof with the first brush 632 and at the other terminal thereof with the contact b of heater switch 630 through a diode $D_{12}$. The other stationary contact of cooler relay 580 is connected with the contact a of heater switch 630, and the coil 581 of cooler relay 580 is connected at one end thereof with the cooler switch 58 and is grounded at the other end thereof. The illuminating lamp 650 is connected at one terminal thereof with the lighting switch L.S used for the on-off of the vehicle's head lamps, clearance lamps, etc. and is grounded at the other terminal thereof. The cooler switch 58 is so constructed that it is not turned on unless the internal-external air lever 57 is placed in the "RECIRC" position.

Figure 8:
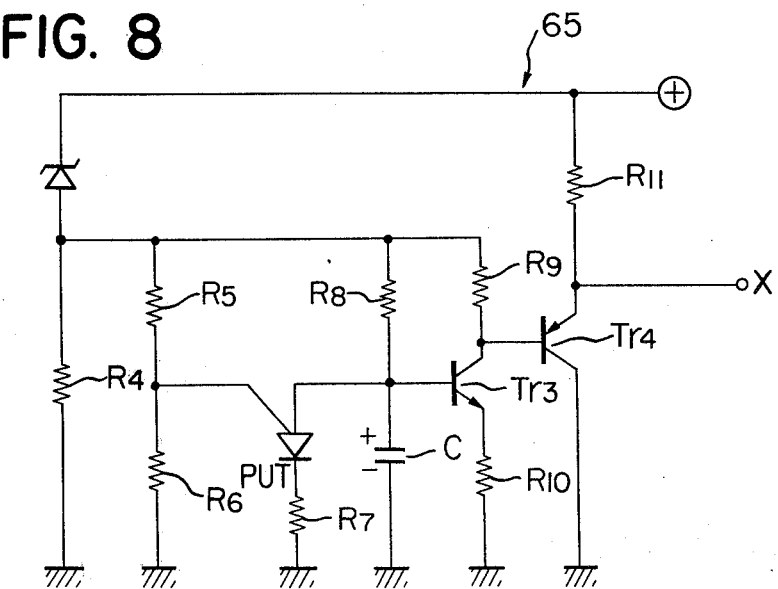
FIG. 8 is a circuit diagram of a flickering circuit in the control section shown in FIG. 7.
Figure 9:
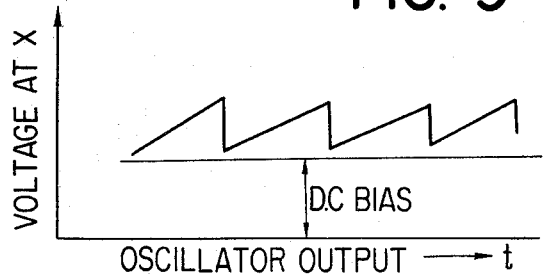
FIG. 9 is a graph showing the variation of voltage at a terminal X of the flickering circuit relative to time.
Figure 10:
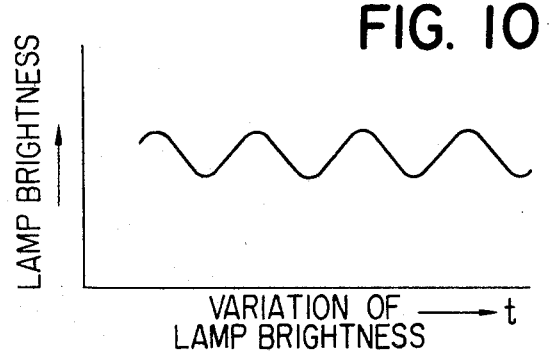
FIG. 10 is a graph showing the variation of brightness of lamps, connected with the flickering circuit.

The flickering circuit 65 is connected at the terminal X thereof with the first to third lamps 641 and 643 and with the movable arm of the heater switch 630. The flickering circuit 65 is composed of a programmable unijunction transistor PUT, resistors $R_4$ to $R_{11}$, transistors $Tr_3$, $Tr_4$, a capacitor C and a Zener diode ZD, as shown in FIG. 8. The oscillation circuit consisting of the programmable unijunction transistor PUT, resistors $R_5$ to $R_8$ and capacitor C generates an output voltage having a waveform as shown in FIG. 9. This output voltage is inversed by the transistor $Tr_3$ and amplified by the amplifier consisting of the transistor $Tr_4$ and resistors $R_9$, $R_{10}$, $R_{11}$, and the electric potential is varied. Thus, the brightness of light emitted from the first to ninth lamps 641 to 649 connected with this terminal X varies in a manner as shown in FIG. 10. The resistor $R_4$ and Zener diode ZD act to apply a DC bias to the output voltage of the oscillation circuit so that the brightness variation or flickering occurs in the light emitted from these lamps in the manner shown in FIG. 10 without these lamps making flashing operation.

In operation, no display is provided in the "OFF" position of the fan switch 53 since no current is supplied from the battery to the first to ninth lamps 641 to 649. However, the illuminating lamp 650 is only energized when the lighting switch L·S is turned on.

Suppose that the fan switch 53 is placed in one of the "L", "M" and "H" positions, the change-over lever 51 is kept in the "DEF" position, the heater lever 52 is kept in the "OFF" position, the internal-external air lever 57 is kept in the "RECIRC" position, and the cooler switch 58 is not turned on. In such a case, the first brush 632 is in electrical contact with the electrode plate 636, and the movable arm of heater switch 630 is in contact with contact b. Consequently, current supplied from the battery flows through the fan switch 53, electrode plate 636, first brush 632, ninth lamp 649 and diode $D_{12}$ to be supplied to the contact b of heater switch 630, thence, to the flickering circuit 65. The ninth lamp 649 emits flickering blue light which passes through the "DEF" display pattern 618 in the shielding plate 613 and then through the smoked panel 612 to reach the display panel 611. Thus, the "DEF" display pattern 618 is displayed on the display panel 611 with flickering blue light which is readily sensed by the eyes of the occupant. Due to, further, the fact that the internal-external air switch 570 is connected at its contact a with the fan switch 53, the third lamp 643 is also energized to emit flickering blue light which passes through the "RECIRC" display pattern 617 and then through the smoked panel 612 to reach the display panel 611. Thus, this "RECIRC" display pattern 617 is displayed on the display panel 611 with flickering blue light which is readily visible to the eyes of the occupant. The operation is similar to that above described when the cooler switch 58 is turned on.

Then, when the internal-external air lever 57 is moved to the "FRESH" position from the "RECIRC" position, the movable arm of internal-external air switch 570 is brought into contact with the contact b to deenergize the third lamp 643 and energize the first lamp 641 in turn, with the result that the "FRESH" display pattern 616 is displayed on the display panel 611 with flickering blue light.

When the heater lever 52 is then moved from the "OFF" position toward the "HOT" position in the state in which the internal-external air lever 57 is placed in the "RECIRC" or "FRESH" position, the movable arm of heater switch 630 is brought into contact with the contact a to deenergize the ninth lamp 649. Since the cooler switch 58 is in its "OFF" position and the relay 580 is in its closed state, the eighth lamp 648 is energized to emit flickering red light which passes through the "DEF" display pattern 618 and then through the smoked panel 612 to reach the display panel 611. Thus, the "DEF" display pattern 618 is displayed on the display panel 611 with flickering red light. In this case, the "RECIRC" or "FRESH" display pattern 617 or 616 is also displayed on the display panel 611 with flickering blue light.

When the cooler switch 58 is turned on with the internal-external air lever 57 kept in the "RECIRC" position and the heater lever 52 kept in the position moved from the "OFF" position, the cooler relay 580 is opened to deenergize the eighth lamp 648.

Table 1 shows the luminant display modes of the display patterns when the heater lever 52 and cooler switch 58 are manipulated in the positions A, B, C, D and E of the change-over lever 51.

such patterns are visible to the eyes of the occupant only when the associated lamps are energized. Further, the occupant can easily see the display panel 611 when he manipulates the air conditioner actuator 5 since the display panel 611 is disposed adjacent to this actuator 5.

The electrode plate 636 and internal-external air switch 570 in FIG. 7 may be connected with the terminal IG of vehicle's ignition key switch instead of being connected with the fan switch 53, so that the first to ninth lamps 641 to 649 can be energized when the ignition key switch is in its IG position. The luminant display modes of the display patterns 616 to 621 in such a modification are similar to those shown in Table 1.

In the first embodiment described hereinbefore, lamps have been used for the air conditioning display. However, in lieu of these lamps, self-emitting elements, light-emitting diode, liquid crystals or any other suitable elements may be used.

Figure 11:
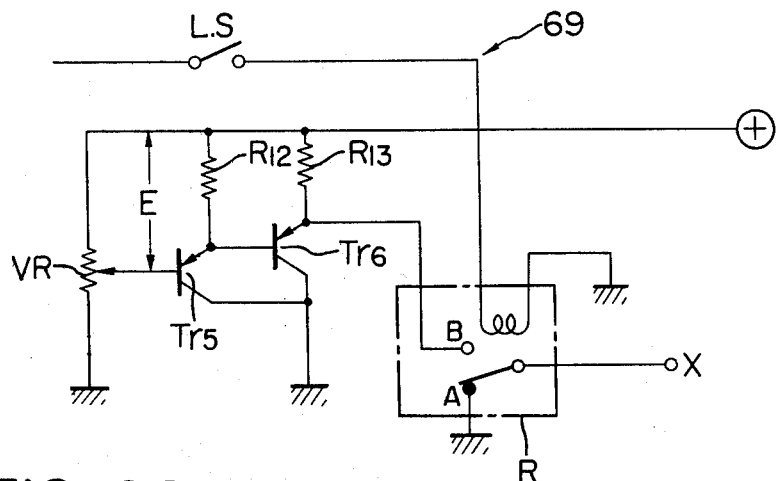
FIG. 11 is a circuit diagram of a light intensity attenuating circuit.

A light intensity attenuating circuit 69 as shown in FIG. 11 may be employed in place of the flickering circuit 65 incorporated in the first embodiment of the present invention. Referring to FIG. 11, this light intensity attenuating circuit 69 is composed of a variable resistor VR, resistors $R_{12}$, $R_{13}$, transistors $Tr_5$, $Tr_6$, a relay R and a lighting switch L·S. When the lighting switch L·S is turned off, the movable arm of relay R is brought into contact with a stationary contact A to short the terminal X to ground, with the result that the first to ninth lamps 641 to 649 emit light of high intensity. On the other hand, when the lighting switch L·S is turned on, the movable arm of relay R is brought into contact with another stationary contact B to connect the terminal X to ground through the transistors $Tr_5$,

TABLE 1

| | | CHANGE-OVER LEVER POSITION | | | | | | | | |
|---|---|---|---|---|---|---|---|---|---|---|
| | | DEF | | BETWEEN DEF AND HEAT | | HEAT | | BETWEEN HEAT AND VENT | | VENT |
| | | A | | B | | C | | D | | E |
| FAN SWITCH & COOLER SWITCH POSITION | DISPLAY PATTERN | | | | | HEATER LEVEL POSITION | | | | |
| | | OFF | EXCEPT OFF | OFF | EXCEPT OFF | OFF | EXCEPT OFF | OFF | EXCEPT OFF | OFF | EXCEPT OFF |
| FAN SWITCH EXCEPT OFF, COOLER SWITCH ON | DEF | L | — | L | — | — | — | — | — | — | — |
| | HEAT | | | | | | | | | | |
| | HEAT/R | — | — | L | — | L | — | L | — | — | — |
| | VENT | — | — | — | — | — | — | L | L | L | L |
| FAN SWITCH EXCEPT OFF, COOLER SWITCH OFF | DEF | L | R | L | R | — | — | — | — | — | — |
| | HEAT | | | | | | | | | | |
| | HEAT/R | — | — | L | R | L | R | L | R | — | — |
| | VENT | — | — | — | — | — | — | L | L | L | L |

REMARKS:
1. SYMBOL "—" INDICATES THAT PATTERNS ARE NOT DISPLAYED. SYMBOLS "L" AND "R" REPRESENT BLUE AND RED DISPLAYS RESPECTIVELY.
2. NONE OF DISPLAY PATTERNS ARE DISPLAYED IN OFF POSITION OF FAN SWITCH.

The "FRESH" and "RECIRC" display patterns 616 and 617 are displayed on the display panel 611 only when the internal-external air lever 57 is placed in its "FRESH" and "RECIRC" position.

It will be understood from the foregoing description of the first embodiment that the occupant can easily visually confirm the flow of air into and out of the air conditioner proper 1 and also the discharge of warm air or cold air merely looking at the display panel 611. The display patterns appearing on the display panel 611 clearly display the flowing directions of air in the strip form so that the flowing directions of air can be readily visually confirmed. The disposition of the display patterns 616 to 621 on the back side of the smoked panel 612 improves the visibility of the display patterns since $Tr_6$ and variable resistor VR, with the result that the intensity of light emitted from the first to ninth lamps 641 to 649 is attenuated to a level lower than when the movable arm of relay R is in contact with the contact A.

The third lamp 643 in the first embodiment may be a red-emitting lamp. The use of such a lamp is preferable since the "RECIRC" display pattern 617 is displayed on the display panel 611 with flickering red light whenever the cooler is in operation, and this manner of display matches well with the actual operating mode of the air conditioner.

In the first embodiment, the profiles 611' of the front glass, bonnet, instrument panel and driver have been depicted on the back face of the display panel 611 with a readily visbile color such as white. However, V-shaped grooves defining the profiles 611' may be formed on the back face of the display panel 611, and the illuminating lamp 650 may be connected with the terminal IG of vehicle's ignition key switch, fan switch 53 and vehicle speed detector switch so that it may be energized whenever the display device 6 is placed in operation.

Figure 20:
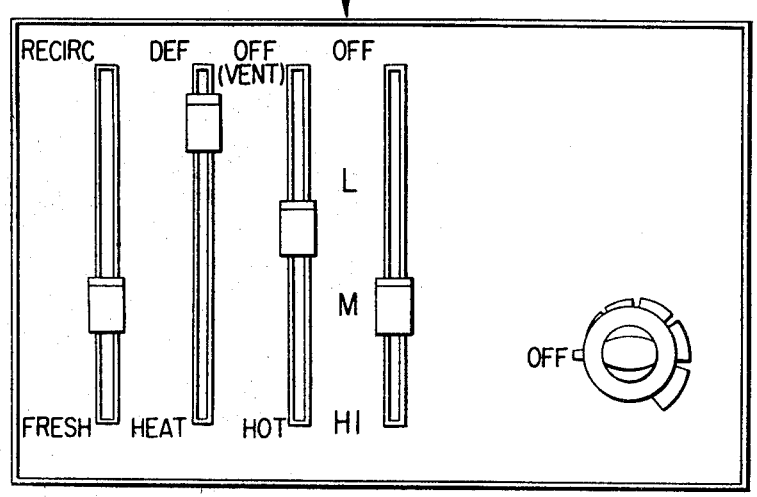
FIG. 20 is a front elevational view of a preferred form of the air conditioner actuator used in the arrangement shown in FIG. 13.
Figure 12:
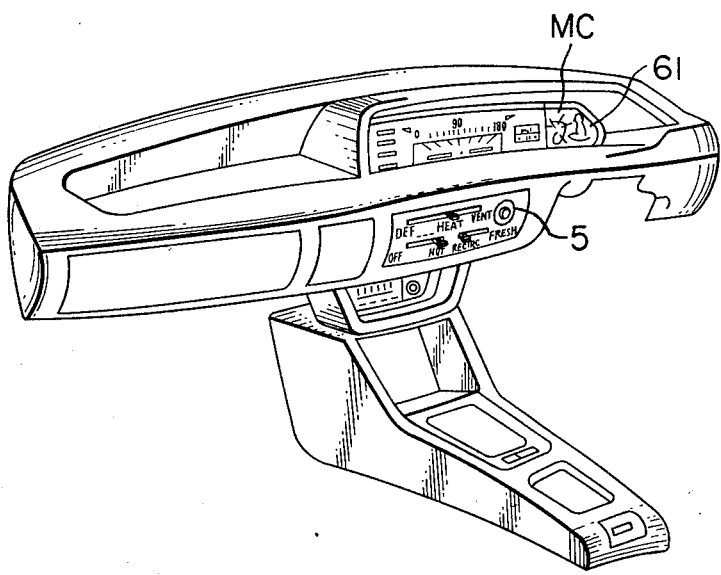
FIG. 12 is a perspective view of a modified arrangement of the air conditioner actuator and display section.
Figure 13:
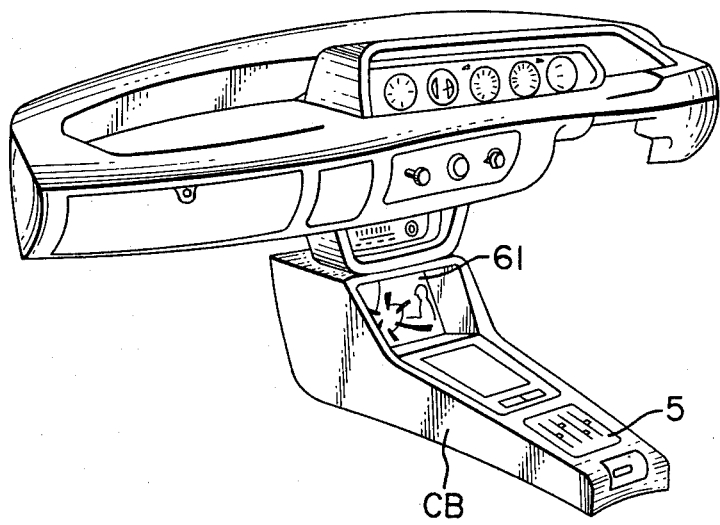
FIG. 13 is a perspective view of another modified arrangement of the air conditioner actuator and display section.

Further, although the display section 61 of the display device 6 has been disposed adjacent to the air conditioner actuator 5 in the first embodiment, this display section 61 may be disposed adjacent to the meter cluster MC as shown in FIG. 12, or it may be disposed at the front end portion of the center console box C·B, and the air conditioner actuator 5 may be disposed at the rear end portion of the center console box C·B as shown in FIG. 13. In such a case, the air conditioner actuator 5 may be of a type as shown in FIG. 20 so that it may be conveniently operated.

Figure 14:
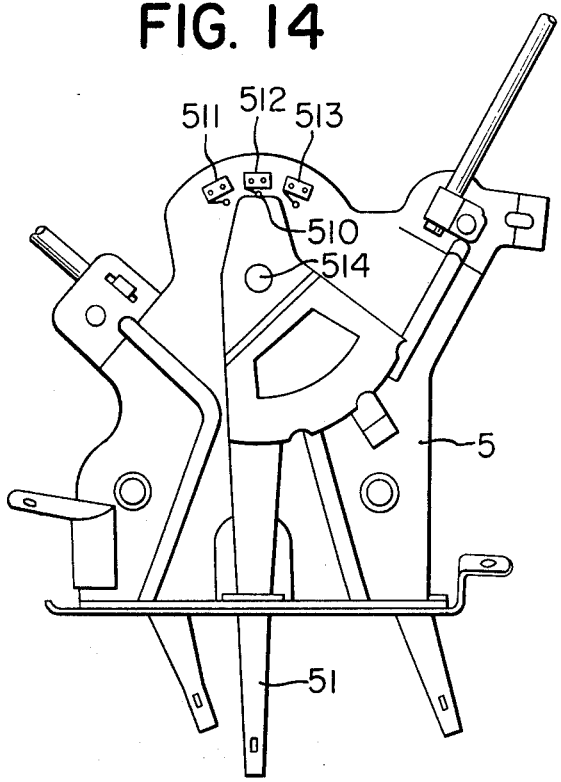
FIG. 14 is a schematic view of a different form of a switch section shown in FIG. 6.

In the first embodiment, the electrode plate 636 and brushes 632,633,634 have been provided for detecting the position of the change-over layer 51. However, this position detecting means may include a different arrangement as shown in FIG. 14. Referring to FIG. 14, the position detecting means is composed of a cam 510 and microswitches 511, 512 and 513. The cam 510 is formed at the end of the change-over lever 51 remote from the manipulated end of the lever 51, and the first microswitch 511 is fixed to the air conditioner actuator 5 to be connected at one terminal thereof with the second lamp 642 illuminating the "VENT" display pattern and at the other terminal thereof with the "L", "M" and "H" terminals of fan switch 53. The second microswitch 512 is also fixed to the air conditioner actuator 5 to be connected at one terminal thereof with the fourth to seventh lamps 644 to 647 and at the other terminal thereof with the "L", "M" and "H" terminals of fan switch 53. The third microswitch 513 is also fixed to the air conditioner actuator 5 to be connected at one terminal thereof with the eighth and ninth lamps 648 and 649 and at the other terminal thereof with the "L", "M" and "H" terminals of fan switch 53. The change-over lever 51 is pivoted to the air conditioner actuator 5 by a pivot 514.

The third microswitch 513 is turned on when the change-over lever 51 is moved to the position A labeled "DEF", and the second and third microswitches 512 and 513 are simultaneously turned on when the lever 51 is moved to the position B intermediate the "DEF" and "HEAT" positions. The second microswitch 512 is turned on when the lever 51 is moved to the position C labeled "HEAT", and the first and second microswitches 511 and 512 are simultaneously turned on when the lever 51 is moved to the position D intermediate the "HEAT" and "VENT" positions. The first microswitch 511 is turned on when the lever 51 is moved to the position E labeled "VENT".

The use of such microswitches 511 to 513 is therefore advantageous in that these microswitches 511 to 513 can be turned on and off as this arrangement eliminates the tendency of accumulation of dust leading to malconduction of current which may be encountered in the case of the first embodiment in which the electrical contacts or the electrode plate and brushes are exposed.

Figure 15:
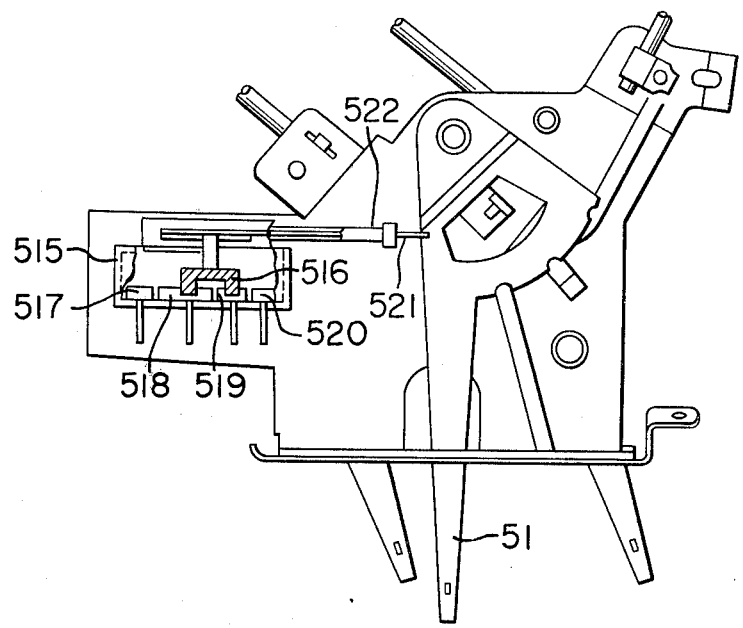
FIG. 15 is a schematic view of another different form of the switch section.

In lieu of the slide switch structure consisting of the electrode plate 636 and brushes 632, 633 and 634 in the first embodiment, a sealed slide switch 515 as shown in FIG. 15 may be employed. Referring to FIG. 15, this sealed slide switch 515 is mounted on the air conditioner actuator 5 and is composed of a slider 516 of electrical conductor and a first to a fourth electrode 517, 518, 519 and 520 sealed within a casing. The slider 516 is connected with the change-over lever 51 by an inner cable 521, and this inner cable 521 extends through a hollow outer cable 522 which is fixed at one end thereof to the air conditioner actuator 5 and at the other end thereof to the slide switch 515. The slider 516 is slidable on the first to fourth electrodes 517 to 520. The first electrode 517 is connected with the eighth and ninth lamps 648 and 649, and the second electrode 518 is connected with the "L", "M" and "H" terminals of fan switch 53. The third electrode 519 is connected with the fourth to seventh lamps 644 to 647, and the fourth electrode 520 is connected with the second lamp 642. The slider 516 makes sliding contact with the first and second electrodes 517 and 518 when the change-over lever 51 is moved to the position A labeled "DEF", and the slider 516 makes sliding contact with the first, second and third electrodes 517, 518 and 519 when the lever 51 is moved to the position B intermediate the "DEF" and "HEAT" positions. The slider 516 makes sliding contact with the second and third electrodes 518 and 519 as shown in FIG. 15 when the lever 51 is moved to the position C labeled "HEAT", and the slider 516 makes sliding contact with the second, third and fourth electrodes 518, 519 and 520 when the lever 51 is moved to the position D intermediate the "HEAT" and "VENT" positions. The slider 516 makes sliding contact with the second and fourth electrodes 518 and 520 when the lever 51 is moved to the position E labeled "VENT", and the lamps connected with the first, third and fourth electrodes 517, 519 and 520 are selectively energized.

Figure 16:
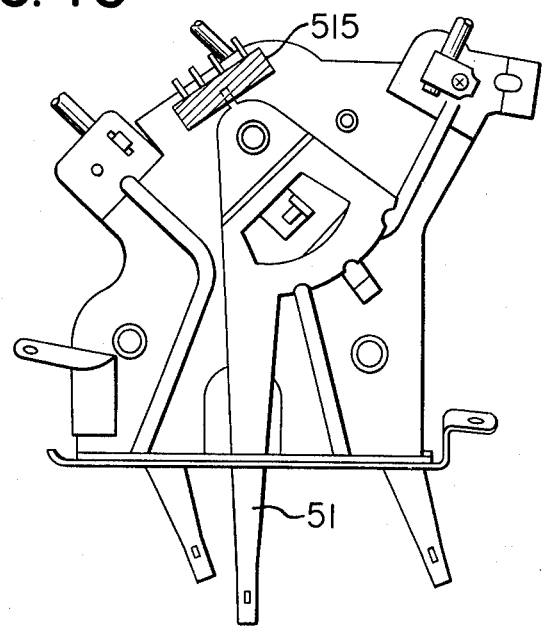
FIG. 16 is a schematic view of still another different form of the switch section.

FIG. 16 shows a modification of the arrangement shown in FIG. 15. In this modification, the slider 516 in the sealed slide switch 515 in FIG. 15 is adapted to be directly urged by the change-over lever 51.

Further, a Fresnel's lens may be mounted on the shielding plate 613 to cover each of the display patterns 612 to 621 used in the first embodiment.

Figure 19:
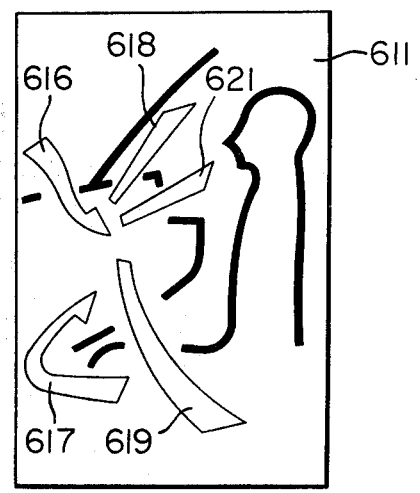
FIG. 19 is a front elevational view of a display section in the second embodiment.
Figure 17:
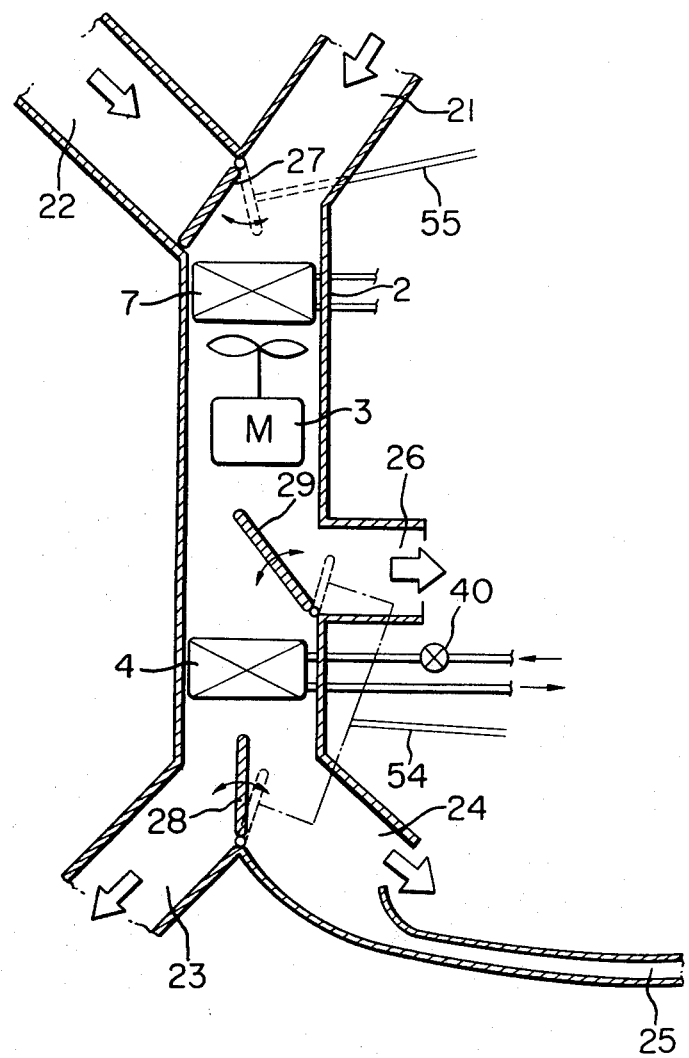
FIG. 17 illustrates part of an air conditioner proper associated with a second embodiment of the present invention.
Figure 18:
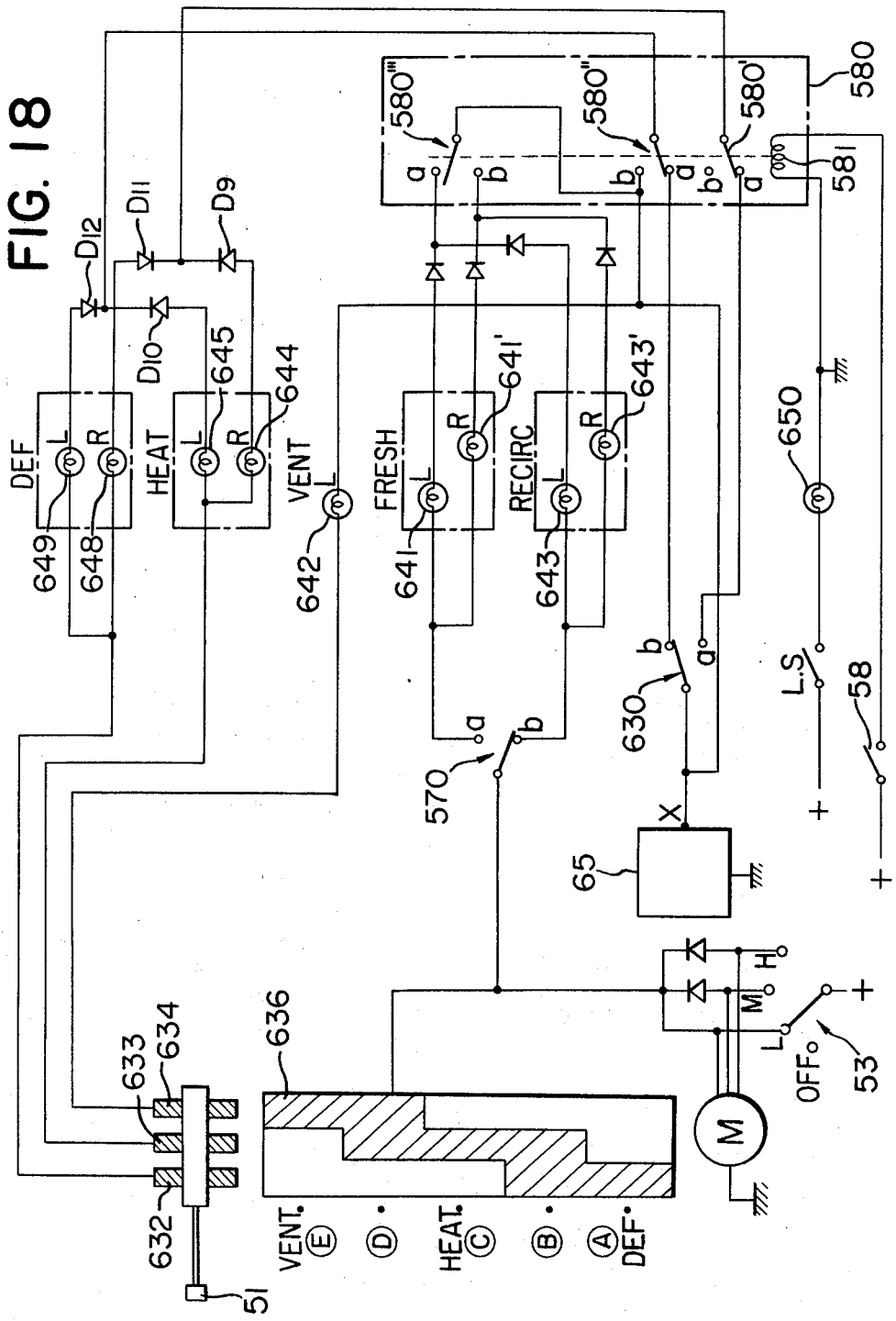
FIG. 18 is a circuit diagram of a control section in the second embodiment.

FIGS. 17 to 19 show a second embodiment, or a modification of the first embodiment, of the present invention, in which the cooler evaporator 7 is disposed in the air duct 2 between the first damper 27 and the fan unit 3, and the "FRESH" and "RECIRC" display patterns 616 and 617 are displayed on the display panel 611 with blue light and red light.

In this second embodiment, the first lamp 641 and an tenth lamp 641' are disposed in the space behind the "FRESH" display pattern 616, and the third lamp 643 and a eleventh lamp 643' are disposed in the space behind the "RECIRC" display pattern 617. The first lamp 641 is connected at one terminal thereof with the stationary contact a of internal-external air switch 570 and at the other terminal thereof with a stationary contact a of a third switch 580''' of cooler relay 580 through a diode. The tenth lamp 641' is connected at one terminal thereof with the contact a of internal-external air switch 570 and at the other terminal thereof with another contact b of third switch 580''' through another diode. The third lamp 643 is connected at one terminal thereof with the contact b of internal-external air switch 570 and at the other terminal thereof with the contact a of third switch 580''' through another diode. The eleventh lamp 643' is connected at one terminal thereof with the contact b of internal-external air switch 570 and at the other terminal thereof with the contact b of third switch 580''' through another diode. The first and third lamps 641 and 643 emit blue light, and the tenth and eleventh lamps 641' and 643' emit red light. The cooler relay 580 includes a first to a third switch 580', 580'' and 580''' in each of which its movable arm is brought into contact with stationary contacts b and a when an exciting coil 581 of relay 580 is energized and deenergized respectively. The first switch 580' is connected at its contact a with the contact a of heater switch 630. The second switch 580'' is connected at its movable arm with the fifth and ninth lamps 645 and 649. The contact a of second switch 580'' is connected with the contact b of heater switch 630, and the contact b is connected with the terminal X of flickering circuit 65. The third switch 580''' is connected at its movable arm with the terminal X of flickering circuit 65.

when the internal-external air lever 57 is placed in the "FRESH" position, and the heater lever 52 is placed in the "OFF" position, while the cooler switch 58 is kept in the "OFF" position, the movable arm of internal-external air switch 570 is brought into contact with the contact a, and the movable arm of heater switch 630 is brought into contact with the contact b, while the movable arm of third switch 580''' of cooler relay 580 is brought into contact with the contact a. Consequently, the first lamp 641 is energized to display the "FRESH" display pattern 616 on the display panel 611 with flickering blue light.

The movable arm of internal-external air switch 570 is brought into contact with the contact b when the internal-external air lever 57 is shifted to the "RECIRC" position. The third lamp 643 is energized to provide flickering blue light display of the "RECIRC" display pattern 617 of the display panel 611.

When the cooler switch 58 is then turned on in the above state, the cooler relay 580 is energized to bring the movable arm of third switch 580''' into contact with the contact b. Consequently, the third lamp 643 is deenergized, and the eleventh lamp 643' is energized in turn to provide flickering red light display of the "RECIRC" display pattern 617 on the display panel 611.

Then, when the internal-external air lever 57 is restored to the "FRESH" position, the movable arm of internal-external air switch 570 is brought into contact with the contact a. Consequently, the eleventh lamp 643' is deenergized, and the tenth lamp 641' is energized in turn to provide flickering red light display of the "FRESH" display pattern 616 on the display panel 611.

Therefore, the "FRESH" and "RECIRC" display patterns 616 and 617 displaying the flowing patterns of air into the air conditioner proper 1 are displayed on the display panel 611 with flickering red light when the cooler is in operation, and although not described, the "HEAT", "DEF" and "VENT" display patterns 619, 618 and 621 displaying the flowing patterns of cold air from the air conditioner proper 1 are displayed on the panel 611 with flickering blue light. Such manner of display matches well with the actual operating state of the air conditioner.

What is claimed is:

1. An air conditioning display system for a vehicle comprising a vehicle's air conditioner proper including at least a plurality of air intake ducts, a plurality of air discharge ducts, a plurality of dampers disposed in said ducts for closing and opening said ducts, and a fan unit, air conditioner actuating means for actuating at least said dampers and said fan unit in said air conditioner proper thereby introducing and discharging air into and out of said air conditioner proper, and a display device mounted in said vehicle and including a display panel carrying the picture of the vehicle body portions including at least the front seat and its neighborhood for displaying on said display panel the flowing patterns of air out of said air conditioner proper at said vehicle body portions, said flowing patterns of discharged air being displayed on said display panel with strip-like display patterns extending substantially in the flowing directions of the air and having no arrowhead, wherein each of said strip-like display patterns for displaying the flowing patterns of air out of said air conditioner proper has a width increased gradually in the direction of air flow.

2. An air conditioning display system as claimed in claim 1, wherein said air conditioner actuating means includes lever means movable for selectively closing and opening said dampers in said air conditioner proper and a cam formed on said lever means, and said display device includes a plurality of microswitches provided in said air conditioner actuating means to be selectively turned on and off by being engaged by said cam, said microswitches being connected with said lamps for selectively energizing and deenergizing said lamps.

3. An air conditioning display system as claimed in claim 1, wherein said air conditioner actuating means includes lever means movable for selectively closing and opening said dampers in said air conditioner proper, and said display device includes a sealed slide switch consisting of a first electrode connected with a power source, and a plurality of second electrodes connected with said plurality of lamps, said first electrode coming into contact with said one or more second electrodes in response to manipulation of said lever means.

* * * * *